(12) United States Patent
Haines et al.

(10) Patent No.: US 9,569,351 B2
(45) Date of Patent: Feb. 14, 2017

(54) STORING CORRESPONDING DATA UNITS IN A COMMON STORAGE UNIT

(75) Inventors: Jonathan Williams Haines, Boulder, CO (US); Timothy R. Feldman, Louisville, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 1181 days.

(21) Appl. No.: 13/027,633

(22) Filed: Feb. 15, 2011

(65) Prior Publication Data

US 2012/0102297 A1 Apr. 26, 2012

Related U.S. Application Data

(60) Provisional application No. 61/406,470, filed on Oct. 25, 2010.

(51) Int. Cl.
*G06F 12/02* (2006.01)

(52) U.S. Cl.
CPC ................... *G06F 12/0246* (2013.01)

(58) Field of Classification Search
CPC .................................................. G06F 12/0246
See application file for complete search history.

(56) References Cited

U.S. PATENT DOCUMENTS

| | | |
|---|---|---|
| 5,778,411 A | 7/1998 | DeMoss et al. |
| 5,960,464 A | 9/1999 | Lam |
| 6,202,121 B1 | 3/2001 | Walsh et al. |
| 7,624,227 B2 | 11/2009 | Ohtsuka |
| 7,903,463 B2 | 3/2011 | Nguyen et al. |
| 8,356,126 B2 | 1/2013 | Ashmore |
| 2003/0056060 A1 | 3/2003 | Hertz et al. |
| 2008/0031050 A1 | 2/2008 | Yoon et al. |
| 2008/0098192 A1* | 4/2008 | Im et al. ...................... 711/170 |
| 2008/0201546 A1 | 8/2008 | Tanaka |
| 2009/0049234 A1 | 2/2009 | Oh et al. |
| 2009/0113112 A1 | 4/2009 | Ye et al. |
| 2009/0125671 A1 | 5/2009 | Flynn et al. |
| 2009/0222596 A1* | 9/2009 | Flynn et al. .................... 710/22 |

(Continued)

OTHER PUBLICATIONS

U.S. Appl. No. 12/721,490, filed Mar. 10, 2010, Goss et al.

(Continued)

*Primary Examiner* — Eric S Cardwell
(74) *Attorney, Agent, or Firm* — Hollingsworth Davis, LLC

(57) ABSTRACT

A storage device controller may segregate data units that are typically accessed together to a common storage unit. In one example, a storage device includes a control unit configured to receive a plurality of logical blocks to be stored in the storage device, wherein a first set of addresses comprises logical block addresses (LBAs) of the plurality of logical blocks, and a non-volatile memory configured to store logical blocks in a plurality of storage units, wherein one of the plurality of storage units includes logical blocks corresponding to a second set of addresses. The control unit may determine an intersection of the first set of addresses with the second set of addresses and to store each of the logical blocks having LBAs in the determined intersection of addresses in a common storage unit of the storage device, wherein the common storage unit comprises one of the plurality of storage units.

23 Claims, 9 Drawing Sheets

(56) References Cited

U.S. PATENT DOCUMENTS

| | | | |
|---|---|---|---|
| 2009/0292788 A1* | 11/2009 | Miyamae | H04L 47/10 709/211 |
| 2009/0313422 A1 | 12/2009 | Lin et al. | |
| 2010/0082886 A1 | 4/2010 | Kwon | |
| 2010/0088467 A1 | 4/2010 | Lee et al. | |
| 2010/0174853 A1 | 7/2010 | Lee et al. | |

OTHER PUBLICATIONS

U.S. Appl. No. 12/721,466, filed Mar. 10, 2010, Goss et al.
U.S. Appl. No. 12/765,761, filed Apr. 22, 2010, Haines et al.
U.S. Appl. No. 12/913,408, filed Oct. 27, 2010, Goss et al.
Chang et al., "Efficient Management for Large-Scale Flash-Memory Storage Systems with Resource Conservation". Term paper form National Chiao-Tung University, Hsin-Chu, Taiwan, published on May 13, 2009, 37 pages.
Rayankula et al., "A Block-Clustering Based Approach to Implement Wear Leveling in SSD". Project Report for University of Minnesota CSci 8980: Advanced Storage Systems, published on May 13, 2009, 22 pages.
Jung et al., "Cache over Solid State Disk through DiskSIM". Project Report for University of Minnesota CSci 8980: Advanced Storage Systems, published on May 13, 2009, 29 pages.
Narang et al., "Integrated Caching and Wear Leveling Algorithm". Term Paper, Department of Computer Science, University of Minnesota, published on May 13, 2009, 7 pages.
Mohammed et al. "Improving Hot Data Identification for Hybrid SLC/MLC Device", Project Report for University of Minnesota CSci 8980: Advanced Storage Systems, published on May 13, 2009, 9 pages.
Hsieh et al., "Efficient Identification of Hot Data for Flash-Memory Storage Systems". Term paper form National Chiao-Tung University, Hsin-Chu, Taiwan, published on May 13, 2009, 19 pages.
File history for U.S. Appl. No. 12/913,408.
File History for U.S. Appl. No. 13/027,620.

* cited by examiner

STORING CORRESPONDING DATA UNITS IN A COMMON STORAGE UNIT

RELATED APPLICATIONS

This application claims the benefit of Provisional Patent Application Ser. No. 61/406,470, filed on Oct. 25, 2010, to which priority is claimed pursuant to 35 U.S.C. §119(e) and which is hereby incorporated herein by reference.

BACKGROUND

Computers and other electronic devices generally require a medium in which digital data can be stored and retrieved. Data storage devices come in a variety of forms and serve a variety of purposes. These devices can be broken down into two general categories: solid state and non-solid state storage devices.

Non-solid state devices are devices that contain moving parts. Some typical non-solid state storage devices are hard disk drives, CD/RW drives and disks, DVD/R/RW drives and disks, floppy disks, tape drives and probe memory devices. These storage devices move one or more media surfaces and/or the associated data head relative to one another to position the data head relative to a desired location or area on the media. The data is then written to or read from this data location. In disk drives for example, data is stored on a disk that rotates at an essentially constant velocity. By moving the head over the rotating disk, all memory locations or sectors of the disk can be accessed.

Solid state storage devices differ from non-solid state devices in that they typically have no moving parts. Solid state storage devices may be used for primary storage of data for a computing device, such as a personal computer, workstation computer, or server computer. Another example of a solid state storage device is flash memory, such as used in a Compact Flash Memory Card. Compact Flash Memory Cards are used primarily for easy and fast information storage in devices such as digital cameras, home video game consoles, smart phones, and personal digital assistants.

Conventional solid state storage devices store logical block address (LBA) blocks in pages of an erasure block. When an erasure block is to be updated, every page therein must be invalidated and entirely rewritten, including both unaltered and altered (e.g., new or modified) data.

SUMMARY

In one example, a method includes receiving, by a storage device, a plurality of logical blocks to be stored in the storage device, determining a subset of the logical blocks that correspond to a common object, and storing each of the logical blocks corresponding to the common object in a common storage unit of the storage device.

In another example, a storage device includes a control unit configured to receive a plurality of logical blocks to be stored in the storage device, and a non-volatile memory configured to store logical blocks in a plurality of storage units. The control unit is configured to determine a subset of the logical blocks that correspond to a common object, and to store each of the logical blocks corresponding to the common object in a common one of the plurality of storage units.

In another example, a computer-readable storage medium includes instructions that, when executed, cause a processor to receive a plurality of logical blocks to be stored in a storage device, determine a subset of the logical blocks that correspond to a common object, and store each of the logical blocks corresponding to the common object in a common storage unit of the storage device.

In another example, a system includes a storage device configured to store logical blocks in a plurality of storage units, and a computing device coupled to the storage device, the computing device comprising a control unit for controlling the storage device, wherein the control unit is configured to receive a plurality of logical blocks to be stored in the storage device, to determine a subset of the logical blocks that correspond to a common object, and to store each of the logical blocks corresponding to the common object in a common one of the plurality of storage units of the storage device.

In another example, a method includes receiving, by a storage device, a plurality of logical blocks to be stored in the storage device, wherein a first set of addresses comprises logical block addresses (LBAs) of the plurality of logical blocks, determining an intersection of the first set of addresses with a second set of addresses, wherein the second set of addresses comprises LBAs of logical blocks in a storage unit of the storage device, and storing each of the logical blocks having LBAs in the determined intersection of addresses in a common storage unit of the storage device.

In another example, a storage device includes a control unit configured to receive a plurality of logical blocks to be stored in the storage device, wherein a first set of addresses comprises logical block addresses (LBAs) of the plurality of logical blocks, and a non-volatile memory configured to store logical blocks in a plurality of storage units, wherein one of the plurality of storage units includes logical blocks corresponding to a second set of addresses. The control unit is configured to determine an intersection of the first set of addresses with the second set of addresses and to store each of the logical blocks having LBAs in the determined intersection of addresses in a common storage unit of the storage device, and the common storage unit includes one of the plurality of storage units.

In another example, a system includes a storage device configured to store logical blocks in a plurality of storage units and a computing device coupled to the storage device, the computing device comprising a control unit for controlling the storage device. The control unit is configured to receive a plurality of logical blocks to be stored in the storage device, wherein a first set of addresses comprises logical block addresses (LBAs) of the plurality of logical blocks. One of the plurality of storage units of the storage device includes logical blocks corresponding to a second set of addresses. The control unit is configured to determine an intersection of the first set of addresses with the second set of addresses and to store each of the logical blocks having LBAs in the determined intersection of addresses in a common storage unit of the storage device, wherein the common storage unit comprises one of the plurality of storage units.

In another example, a computer-readable medium, such as a computer-readable storage medium, contains, e.g., is encoded with, instructions that cause a programmable processor to receive a plurality of logical blocks to be stored in a storage device, wherein a first set of addresses comprises logical block addresses (LBAs) of the plurality of logical blocks, determine an intersection of the first set of addresses with a second set of addresses, wherein the second set of addresses comprises LBAs of logical blocks in a storage unit of the storage device, and store each of the logical blocks having LBAs in the determined intersection of addresses in a common storage unit of the storage device.

The details of one or more examples are set forth in the accompanying drawings and the description below. Other features, objects, and advantages will be apparent from the description and drawings, and from the claims.

DETAILED DESCRIPTION

In general, this disclosure describes techniques for storing data units that are typically read or written together in a common storage unit. The techniques involve identifying a set of blocks that are typically read or written together, and storing the set of blocks in a common storage unit. The set of blocks may correspond to a common object. The techniques also include an initial identification of a set of blocks to be stored to a common storage unit based on, for example, a determination that the set of blocks correspond to a common object. For example, the set of blocks may correspond to a common objects when the set of blocks have logical block addresses in close spatial and/or temporal proximity when the blocks are to be initially stored, correspond to two or more streams that are periodically accessed at expected rates, include file system data, or when a host computer explicitly indicates that the logical blocks correspond to a common object. The set of blocks may be referred to as a "segregation set" in this disclosure, e.g., because the set of blocks may be segregated to a common storage unit. Storage units may also be referred to in this disclosure as "garbage collection units," in reference to a storage unit that must, for physical or logistic reasons, have all of its valid data copied somewhere else before it can be reused.

Initially, a computing device or control unit may execute one or more detectors when a write occurs that examines a set of blocks to be written, in order to identify blocks that are related to a common object. For example, the detectors may detect blocks having logical block addresses that are spatially close, e.g., in sequence (that is, in LBA order, either forward or backward, that is, ascending or descending LBA order) or within a certain number of addresses of each other. While the detector continues to detect logical blocks that are in sequence (or have logical block addresses (LBAs) that are close to the sequence, in some examples), the detector may add the logical blocks to the set of blocks to be segregated. When after a period of time a logical block is not detected in sequence, the detector may determine that the set has closed and cause the logical blocks of the set to be stored in a common storage unit. After determining that a set of blocks should be segregated, the computing device or control unit may determine whether the set of blocks to be written has any overlap with a currently written set of blocks in a single storage unit. In one example, when the intersection of these two sets exceeds a minimum size, the intersection may be treated as a segregation set that is written to a common storage unit. In other examples, detectors may detect two or more streams of data that are periodically accessed at expected rates, blocks that include file system data, or receive an explicit indication of an object from a host computer and determine blocks that correspond to the host-defined object.

Figure 1:
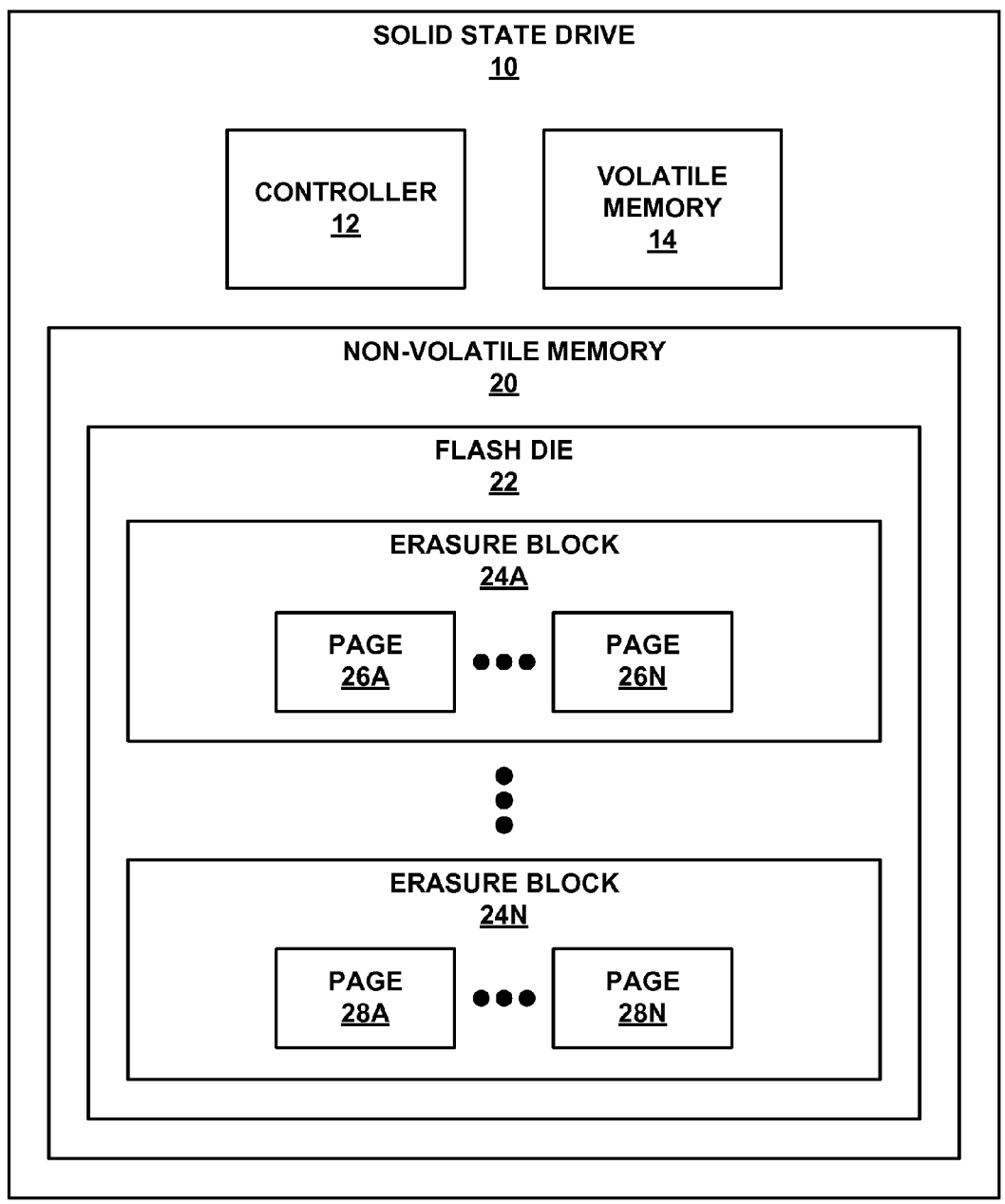
FIG. 1 is a block diagram illustrating an example solid state drive (SSD).

FIG. 1 is a block diagram illustrating an example solid state drive (SSD) 10. In the example of FIG. 1, SSD 10 includes controller 12, volatile memory 14, and non-volatile memory 20. Volatile memory 14 may correspond to random access memory (RAM). Non-volatile memory 20 corresponds to long-term storage of SSD 10. In general, SSD 10 includes one or more flash dies, such as flash die 22, each of which include a plurality of erasure blocks 24A-24N (hereinafter referred to as erasure blocks 24). Flash die 22 may generally comprise one or more semiconductor chips. Each of erasure blocks 24 includes a plurality of pages. In the example of FIG. 1, erasure block 24A includes pages 26A-26N (hereinafter pages 26) and erasure block 24N includes pages 28A-28N (hereinafter pages 28). It should be understood that the letter N in the reference numerals above is a non-negative integer and that the use of N with respect to different reference numbers should not be understood as implying that the number of items are equal. For example, the number of pages 26 is not necessarily equal to the number of pages 28. Likewise, the number of erasure blocks 24 is not necessarily equal to the number of pages 26 or the number of pages 28.

In the example of FIG. 1, SSD 10 includes controller 12. Controller 12 comprises hardware, such as one or more processors, microprocessors, digital signal processor (DSPs), application specific integrated circuits (ASICs), field programmable gate arrays (FPGAs), or any other equivalent integrated or discrete logic circuitry for performing the functions ascribed to controller 12. In other examples, a computing device (not shown) coupled to SSD 10 may implement the functionality ascribed to controller 12. For example, an SSD may not include controller 12, and instead a software driver implemented by an operating system of the computing device may perform the functions of controller 12. In this manner, a processor or other control unit separate from SSD 10 may control SSD 10.

In general, SSD 10 stores data for a long-term period in a page, such as page 26A of erasure block 24A. Pages 26, 28 contain units referred to as "logical blocks." Data is referenced using the logical block address (LBA) of each stored logical block, also referred to simply as an "LB". These data may each be written to individual regions of pages 26, 28. Controller 12 also writes data regarding each page to a page header stored in the page. The page header generally includes metadata that describes data of the corresponding page. The page header may include data such as the address of the LBs written to a page.

Before writing data to a page, such as page 26A, controller 12 writes the data to volatile memory 14. Controller 12 accumulates a full page of data in volatile memory 14 before writing the page to non-volatile memory 20, e.g., in page 26A. As controller 12 receives LBs to be stored from a host (e.g., a computing device coupled to SSD 10), controller 12 writes the received LBs to volatile memory 14. After receiving a sufficient amount of data in volatile memory 14, e.g., to fill a page, controller 12 may write the data from volatile memory 14 into one or more pages of erasure blocks in non-volatile memory 20.

When a host computer or other device requests a particular LBA from SSD 10, controller 12 may determine a flash die, erasure block, and page in which the data for the requested LBA is stored, e.g., using the header data of a page. Subsequently, the host may modify and write data for the LBA back to SSD 10, in which case controller 12 may store the replacement data for this LBA in a different page, a different erasure block, and/or a different flash die. When controller 12 writes the LB to a different page, the corresponding physical block that stored the LB that was read becomes invalid. Controller 12 may indicate whether a particular block of a page is valid or invalid using data stored in the header of the page or in data stored in volatile memory 14.

Controller 12 may be configured to routinely analyze portions of non-volatile memory 20 for invalid data in order to perform garbage collection, e.g., moving valid data from a plurality of erasure blocks that have only a small portion of valid data to one erasure block that is currently at least partially-empty, where this part has not been written since its last erasure. Controller 12 may then erase each of the plurality of erasure blocks from which the LBs were moved, such that each of the plurality of erasure blocks becomes usable for receiving new data.

In accordance with the techniques of this disclosure, controller 12 may attempt to recognize a set of LBAs that are frequently read and written together, e.g., in close spatial and/or temporal proximity. Controller 12 may then segregate such LBs to be written to a common storage unit, such as a particular one of erasure blocks 24. In this manner, when the host reads the LBs of the segregated set, controller 12 may retrieve each of the requested LBs from the same erasure block, rather than energizing a number of erasure blocks for the requested LBs. That is, in recognition of the likelihood that a set of LBs that are frequently read and written together will be read together in the future, controller 12 may store the set of LBs in a common storage unit, such as a common erasure block.

To determine whether to segregate a set of LBs, controller 12 may compare a set of LBs to be written to SSD 10 to sets of LBs stored in erasure blocks 24. This disclosure may refer to the set of LBs of one of erasure blocks 24 as a previously written set of LBs and the set of LBs to be written to SSD 10 as a write-request set of LBs. The write-request set of LBs may generally correspond to a set of LBs for which SSD 10 has received write requests within close temporal proximity or having LBAs in close spatial proximity. As an example, two LBAs that are in close spatial proximity may comprise two LBAs, LBA_x and LBA_y, for which the difference |LBA_x−LBA_y| is within a threshold. The previously written set of LBs may correspond to LBs of a common storage unit, such as one of erasure blocks 24. Controller 12 may then determine a segregation set of LBs, that is, a set of LBs to be written to a common storage unit (e.g., a common one of erasure blocks 24) by determining the intersection of the previously written set of LBAs and the write-request set of LBs. The resulting intersection may correspond to the segregation set of LBs. Because a request to write LBs to SSD 10 generally results in previously stored versions of the LBAs being invalidated, the segregation set of LBAs may also be referred to as a most recently invalidated set of LBAs.

In general, where this disclosure refers to an intersection between an existing segregation set or a storage unit (such as an erasure block) and a set of LBAs to be stored, the intersection is calculated with respect to valid data in the existing segregation set or storage unit. Invalid data may be skipped when performing the intersection. Moreover, the intersection may be determined of LBAs of blocks stored by the existing segregation set or storage unit and LBAs of blocks that are to be stored. That is, when an LBA of a block of valid data appears in the segregation set or storage unit, and when the logical address also appears in a recent write request, the logical address may be considered part of the intersection.

In some examples, controller 12 writes data for each of the LBAs in the segregation set to a common one of erasure blocks 24, without writing data for any other LBAs to the erasure block. In some examples, controller 12 may be configured with a minimum size for segregation sets, e.g., to avoid situations in which a relatively small number of LBs are written to an erasure block and prevent additional data from being written to the erasure block. The minimum size of a segregation set may be configurable, e.g., by an administrator or by controller 12 automatically. For example, controller 12 may be configured to automatically adjust the minimum size of a segregation set based on current conditions for SSD 10, as described in greater detail below.

In some examples, when the size of a segregation set is less than a full erasure block, controller 12 may add data for LBAs from the write-request set to the erasure block. In this manner, controller 12 may attempt to determine whether data for LBAs for which write requests have recently been received should be included in the segregation set. That is, the next time the data for LBAs of the erasure block are written by the host, controller 12 may again determine the intersection of the set of LBAs in the erasure block and the set of LBAs in the write request as a segregation set, which may include the LBAs of the previous segregation set as well as the new LBAs that were stored with the previous segregation set.

In some examples, controller 12 may implement or interact with a probabilistic estimator to determine efficacy of segregating a set of LBAs. The probabilistic estimator may maintain confidence values for segregated sets of LBAs over time, where a confidence value generally represents a determination of how well a corresponding segregation set fits LBAs that should be grouped together. In one example, to generate such confidence values, the probabilistic estimator may implement an infinite impulse response filter. The filter may calculate the confidence value of a segregated set over time based on the previous value for the set and a determined value for a current version of the set. For example, the confidence value, P, may be calculated according to the following formula, given new information that helps to refine our confidence during this re-segregation cycle:

$$P_k = (1-\alpha) \cdot P_{k-1} + \alpha \cdot Q_k$$

where $P_k$ represents the new confidence value for the segregation set, $P_{k-1}$ represents the previous confidence value for the segregation set, $Q_k$ represents a determined confidence value for a most recent version of the segregation set, e.g., when the segregation set is newly stored to one of erasure blocks 24, and $\alpha$ is a constant, real number between 0 and 1, that is, $0 < \alpha < 1$.

Examples of $Q_k$ may include:

Fraction of the previous segregation set that is in the new segregation set

Fraction of an EB that is in the new segregation set

1−ABS((Current Heat Estimate−Previous Heat Estimate)/Previous Heat Estimate)

Over-provisioning generally refers to utilization of a difference between physical capability of storage of a solid state drive and the host_capacity of the solid state drive. That is, solid state drives are typically physically capable of storing more than the "host_capacity," or the amount of data that a host computing device is permitted to store in the solid state drive. Solid state drives use this extra capacity to shift data among erasure blocks to avoid constantly erasing the erasure blocks, e.g., to avoid excessive wear on a subset of the erasure blocks. When a physical region of a solid state drive is determined to have gone bad, the region may be removed from the over-provisioning capacity. The over-provisioning capacity of a solid state drive may be expressed as a raw capacity value (e.g., one gigabyte or one gibabyte) or as a percentage of the host_capacity (e.g., 10% of host_capacity or 50% of host capacity).

Controller 12 may calculate an over-provisioning value and compare the over-provisioning value to an over-provisioning threshold. Controller 12 may calculate the over-provisioning value as a percentage of the over-provisioning capacity that is being used. For example, controller 12 may calculate:

$$\text{Over-provisioning value} = \frac{(\text{physical\_capacity} - \text{host\_capacity})}{\text{host\_capacity}}$$

In this formula, physical_capacity is a value that represents how much data SSD 10 is actually capable of storing, and host_capacity is a value that represents an advertised amount of storage space available to the host. That is, the host is only permitted to write data to SSD 10 up to the host capacity, even if the physical capacity of SSD 10 is larger than the host capacity.

In some examples, controller 12 calculates an effective over-provisioning value. Some hosts use only a certain percentage of the host capacity, e.g., 50% of host capacity, without exceeding or expecting to exceed this utilization. Controller 12 may measure typical usage by a host. After an analysis period, controller 12 may determine that the controller is able to use space that is actually allocated to the host (i.e., host capacity) for over-provisioning. Treatment of this space in this manner by controller 12 is referred to as effective over-provisioning.

Controller 12 may use the effective over-provisioning value as a factor in determining a minimum size of a set of LBAs to be segregated. For example, controller 12 may generally determine that the minimum size of a set of LBAs to be segregated is relatively small when the calculated over-provisioning value is relatively small, whereas controller 12 may determine that the minimum size of a set of LBAs to be segregated is relatively large when the calculated over-provisioning value is relatively large. The minimum size of a set of LBAs to be segregated may be expressed in various ways, such as, for example, as a number of bits, bytes, or LBAs, or as a percentage of an erasure block.

The techniques of this disclosure may also modify garbage collection processes. In general, garbage collection involves searching for storage units, e.g., garbage collection units, that include both valid and invalid data, relocating the valid data of a plurality of garbage collection units to other storage units, and erasing the garbage collection units from which the valid data was collected and moved. Garbage collection may result in collecting valid data in common storage areas and freeing space in storage areas that previously stored a mix of valid and invalid data. In this manner, additional data may be written to the recently cleared storage units. Rather than utilizing the conventional process of selecting garbage collection units having almost no valid data, however, controller 12 may skip, or reduce the priority of garbage collection for, such garbage collection units when an entry of the garbage collection units has recently been invalidated, in recognition of the likelihood that more of the valid data of such garbage collection units will become invalid in the near future.

Although FIG. 1 provides an example of a solid state drive to which the techniques of this disclosure are applied, it should be understood that the segregation techniques of this disclosure may be applied to other computer-readable media as well. In general, the techniques of this disclosure may be applied to any computer-readable media to which data may be written multiple times. For example, the techniques may be applied to computer-readable media having defined lifecycle management protocols, such as garbage collection. The techniques of this disclosure may be applied, for example, to magnetic media such as hard drives or rewriteable optical media such as CD-RW and DVD-RW disks, in addition to solid state storage media.

The techniques of this disclosure may provide a number of advantages. For example, the techniques of this disclosure may reduce wear for a computer-readable medium by segregating a set of blocks (e.g., LBs) to a common storage unit, such as a common erasure block or set of erasure blocks, when the set of blocks is typically read or written in close spatial or temporal proximity. That is, by storing the set of blocks in a common storage unit, and when the set of blocks is subsequently read and then again written to the storage device, only the previous storage unit that stored the set of blocks may become invalidated by the subsequent write. In this manner, only the previous storage unit would need to be erased during garbage collection, rather than needing to erase a number of storage units. The techniques may also improve the speed of access to the set of blocks when the set of blocks are read, because once one of the set of blocks is found in a storage unit, each of the other blocks can be read from the storage unit, assuming that the set of blocks is read in close temporal proximity. In some examples, when valid data in an erasure block that is being copied is self-similar with respect to temporal proximity (and in some examples spatial proximity), performance and/or wear gains may result from keeping such data segregated from data with less temporal and spatial locality.

Figure 2:
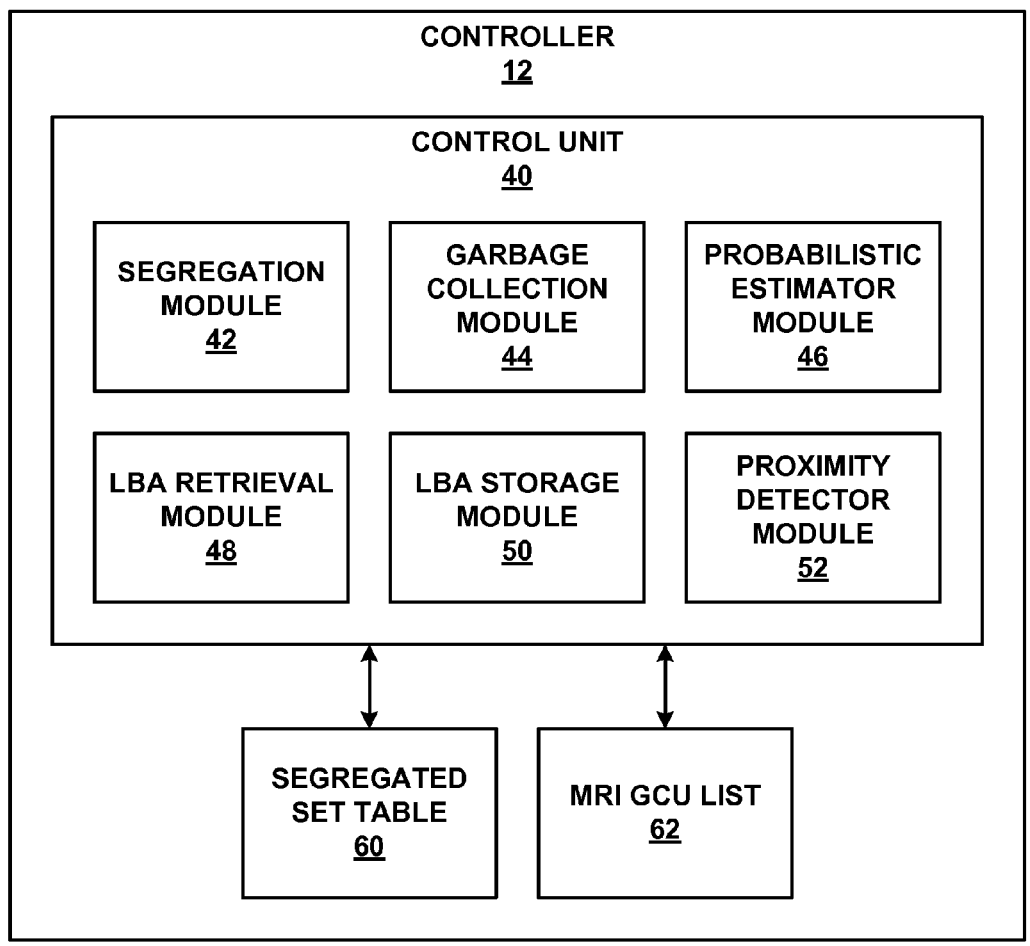
FIG. 2 is a block diagram illustrating an example arrangement of components of a controller.

FIG. 2 is a block diagram illustrating an example arrangement of components of controller 12. In the example of FIG. 2, controller 12 includes control unit 40, which includes segregation module 42, garbage collection module 44, probabilistic estimator module 46, LBA retrieval module 48, LBA storage module 50, and proximity detector module 52. Controller 12 also includes segregated set table 60, which controller 12 may use to keep track of segregated sets stored in SSD 10.

Control unit 40 may include hardware, software, and/or firmware for performing the functions attributed to control unit 40. For example, control unit 40 may include one or more processors and a computer-readable storage medium comprising instructions for segregation module 42, garbage collection module 44, probabilistic estimator module 46, LBA retrieval module 48, LBA storage module 50, and proximity detector module 52. The one or more processors may then execute the instructions for these modules to perform the techniques of this disclosure. Although segregation module 42, garbage collection module 44, probabilistic estimator module 46, LBA retrieval module 48, LBA storage module 50, and proximity detector module 52 are illustrated as separate modules in the example of FIG. 2, it should be understood that any or all of the modules may be functionally integrated to form individual modules, or one or more functional elements of the modules may be separated into distinct modules.

Controller 12 may store data for segregated set table 60 in volatile memory 14 or non-volatile memory 20. For example, while SSD 10 is active, controller 12 may store segregated set table 60 in volatile memory 14. When SSD 10 receives a signal to shut down, controller 12 may write segregated set table 60 to non-volatile memory 20. Likewise, controller 12 may periodically store a current copy of segregated set table 60 to non-volatile memory 20 and invalidate data for a previously stored version of the table stored in non-volatile memory 20.

LBA retrieval module 48 may receive and process requests to retrieve data for one or more LBAs stored by SSD 10. For example, LBA retrieval module 48 may receive retrieval requests from a host computer coupled to SSD 10. The requests may include LBAs of blocks to be retrieved. LBA retrieval module 48 may determine a flash die, erasure block, and page in which requested data for LBAs are stored. Upon finding the location of a stored LBA, LBA retrieval module 48 may retrieve the data for the LBA and provide the data to the requesting host computer. In some examples, LBA retrieval module 48 first determines whether the LBA is valid before retrieving data for the LBA. For example, LBA retrieval module 48 may determine whether a status flag associated with the LBA at a particular location indicates that the data of the LBA is valid.

LBA storage module 50 may receive data from the host computer, select a flash die, erasure block, and page in which to store the data, and then store the data in the selected page of the selected erasure block of the selected flash die. If data with the same logical address had previously been stored somewhere in non-volatile memory 20, LBA storage module 50 also sets a status flag associated with the location at which the data for the LBA had previously been stored to represent that the data is no longer valid at that location. Moreover, upon storing the data for the LBA, LBA storage module 50 may set a status flag associated with the newly stored LBA to represent that the data for the LBA is valid. In the example of FIG. 2, LBA storage module 50 sets the status flags in segregated set table 60. In other examples, the status flags may be stored in header data of a corresponding erasure block, page, or flash die, or in a different table or other data structure stored, e.g., in volatile memory 14.

LBA storage module 50 may write blocks of the write request to SSD 10 in the order in which the blocks are received. This ordering of the blocks may be referred to as a temporal ordering, as the blocks are written in the temporal order in which they are received. Such an example may be advantageous when the host computer will request to read the blocks in the order in which they were written. In another example, LBA storage module 50 may reorder the blocks such that the blocks are written in logical address order. This ordering of the blocks may be referred to as a spatial ordering, as the blocks are written in the order of the LBAs of the blocks. Such an example may be advantageous when the host computer will request to read blocks in the logical address range from the lowest to the highest logical address of the blocks.

Segregation module 42 may perform the segregation techniques of this disclosure. In some examples, segregation module 42 may determine whether to segregate a set of LBAs in response to a write request from the host computer, when writing of at least one LBA in the request will cause the data of a block having the same logical address to become invalid. LBA storage module 50 may be configured to first send a signal to segregation module 42 when a block to be stored will cause another block having the same logical address to become invalid. The signal may cause segregation module 42 to determine whether it would be appropriate to segregate a subset of the blocks in the request.

In general, segregation module 42 may determine the intersection between a set of LBAs to be written to SSD 10 and a set of LBAs already written to a common storage unit, such as one of erasure blocks 24. Segregation module 42 may determine whether the intersection results in a subset large enough to justify segregation of the blocks to a common storage unit. That is, segregation module 42 may compare the size of the subset resulting from the intersection to a threshold segregation set size and segregate the subset when the size of the subset is equal to or greater than the threshold segregation set size. To determine which of the existing erasure blocks to compare the set of incoming LBAs, segregation module 42 may perform a lookup on which erasure block contains a previous copy of LB data for a first LBA in the set of LBAs to be written to SSD 10, and possibly inspect temporally-prior and temporally-subsequent erasure blocks that were written to during a last write.

The threshold segregation set size may be defined in relationship to the size of a garbage collection unit, such as an erasure block. For example, the threshold segregation set size may comprise one-half or three-quarters of an erasure block. In some examples, the threshold segregation set size may be customizable by a user, such as an administrator. Moreover, the threshold segregation set size may vary based on various attributes of SSD 10, such as, for example, current over-provisioning of SSD 10. For example, when SSD 10 is not highly over-provisioned, segregation module 42 may set the threshold segregation set size relatively high, whereas when SSD 10 is highly over-provisioned, segregation module 42 may set the threshold segregation set size relatively low.

In the example of FIG. 2, segregation module 42 maintains segregation set table 60 to keep track of sets of LBAs that have been segregated, confidence values for each segregation set, and current locations of segregation sets, e.g., current erasure blocks that are storing segregation sets. Segregation module 42 may determine whether a particular LBA for which a write request has recently been received is currently stored in a segregation set by checking segregation set table 60. When an LBA is currently stored in a segregation set, segregation module 42 may determine whether other LBAs in close proximity to the LBA (e.g., within close temporal or spatial proximity to the write request for the LBA) are also currently stored in the segregation set by referring to segregated set table 60. Segregation module 42 may add each LBA stored in both the existing segregation set and in close proximity to the requested LBA to a new segregation set that segregation module 42 may then store in a common storage unit.

Segregation module 42 may keep track of various data in segregated set table 60. In one example, segregation module 42 may assign each segregation set a unique identifier, e.g., a segregation set identifier. For each segregation set, segregation module 42 may track data such as LBAs of blocks in the segregation set, time of last write, size of continuous LBA ranges written by the host, time of last activity, and/or range of addresses in the set (e.g., highest address and lowest address). In some examples, to assign the unique identifier, segregation module 42 may execute a hash function on parametrics about data in a set such as, for example, time of last write, size of blocks in the set, and LBAs of the blocks. The unique identifier resulting from such a hash function may be referred to as a probabilistically-unique identifier.

An administrator or other user may modify a time threshold to set a value for temporal proximity. That is, the time between receiving write requests for two or more LBAs that is considered temporally close may differ, based on customization, in various examples. In an example default configuration, write requests for two or more LBAs are considered to be in close temporal proximity when the write requests are received within 100 milliseconds of each other. Similarly, spatial proximity may also be customizable. In an example default configuration, write requests for two or more LBAs are considered to be in close spatial proximity when the LBAs are within 16,384 addresses of each other. Other values may be used in other examples.

Garbage collection module 44 may periodically or continually perform garbage collection for SSD 10. In general, as described above, garbage collection involves moving valid data from one or more garbage collection units, such as erasure blocks, to other erasure blocks, in order to isolate and clear invalid data. That is, although an erasure block (for example) may include both valid and invalid data, in order to overwrite data of an erasure block, the erasure block must be cleared. Therefore, garbage collection unit 44 may move valid data from one or more erasure blocks that also include invalid data to cleared erasure blocks, then clear the erasure blocks from which the valid data was moved. In this manner, the recently cleared erasure blocks may be used to receive new data or copied data from other erasure blocks during garbage collection.

Garbage collection unit 44 may select erasure blocks (or other garbage collection units) having at least a certain percentage of invalid data for garbage collection. Garbage collection unit 44 may also select erasure blocks having no valid data to be cleared and used subsequently for storage of valid data moved from other erasure blocks during garbage collection. Such destination erasure blocks may be referred to as "target erasure blocks" (or, more generally, "target garbage collection units").

In accordance with this disclosure, garbage collection module 44 may skip or reduce a priority for garbage collection units, such as erasure blocks, for which data has recently been invalidated when selecting garbage collection units to be processed during garbage collection. That is, in recognition of the likelihood that valid data of an erasure block that has recently invalidated data will be invalid in the near future, the techniques of this disclosure provide for skipping the move of the valid data to another garbage collection unit, e.g., a target garbage collection unit. In particular, garbage collection module 44 may skip or reduce priority for such a garbage collection unit, in favor of removing valid data from a garbage collection unit that has not had data recently invalidated.

In this manner, garbage collection module 44 may avoid selecting a garbage collection unit for garbage collection that has mostly-invalid data but also has at least a portion of data that was recently invalidated. By skipping such a garbage collection unit, garbage collection module 44 may avoid situations in which valid data that is moved to a target garbage collection unit is soon thereafter invalidated, e.g., due to a host write of data having the same logical address as the relocated data.

In the example of FIG. 2, garbage collection module 44 maintains most-recently-invalidated (MRI) garbage collection unit (GCU) list 62 that includes an ordered list of entries for garbage collection units that have recently had at least one block invalidated. The time period for determining whether a garbage collection unit has recently had invalidated data may vary. In one example, garbage collection units for which data has been invalidated in the last one second remain on the list. Accordingly, garbage collection module 44 may skip removing valid data from garbage collection units corresponding to entries in MRI GCU list 62 when performing garbage collection. In some examples, garbage collection module 44 may keep garbage collection units in the list for which data has been deleted within a number of time units of host write commands. For example, in the last N GCUs worth of host writes (that is, host writes writing a sufficient amount of data to fill N GCUs), a GCU that has had any data invalidated due to host writing may be left on the MRI list. In some examples, if the MRI list is N entries long, then the last N GCUs that have had invalidations due to host requests could be excluded from the garbage collection process. MRI GCU list 62 may correspond to any suitable data structure for storing such a list such as, for example, an array, a linked list, or other suitable data structure. When LBA storage module 50 writes a logical block to SSD 10, LBA storage module 50 invalidates any previous version of the logical block, that is, a block having the same logical address. Upon invalidating data of an erasure block, LBA storage module 50 may add the erasure block to MRI GCU list 62, to indicate that the erasure block is the erasure block that as most recently had data become invalid. In some examples, a GCU moves to the top of MRI GCU list 62 when data of the GCU is invalidated, forcing the entry at the bottom of MRI GCU list 62 off of the list, assuming the list is at full capacity and the added GCU was not already in MRI GCU list 62.

Garbage collection module 44 may further interact with proximity detector module 52 to determine whether the valid data remaining in the garbage collection unit is in close proximity to the data that was recently invalidated in the garbage collection unit. Close proximity may be determined by either or both of close spatial proximity (e.g., the LBAs of two blocks being within a certain number of addresses of each other) or close temporal proximity (e.g., two blocks that were written to SSD 10 within a certain time period). In some examples, when garbage collection module 44 discovers a garbage collection unit that has recently invalidated data, e.g., a particular block that was recently invalidated, garbage collection module 44 may determine whether any remaining valid blocks of the garbage collection unit are in close proximity (spatial or temporal) to the block that was recently invalidated. Garbage collection module 44 may then skip garbage collection for the garbage collection unit when a remaining valid block is in close proximity to the recently invalidated block, but otherwise may perform garbage collection for the garbage collection unit.

Proximity detector module 52, as discussed above, determines whether two or more blocks are in close proximity, e.g., spatial or temporal proximity. Proximity detector module 52 may determine that two blocks are in close spatial proximity when the LBAs of the blocks are within a certain number of addresses. Alternatively, "close spatial proximity" may be defined as LBs that were written to or garbage collected to a GCU together, regardless of whether their LBAs are close to each other. Proximity detector module 52 may determine that two blocks are in close temporal proximity when requests to write the two blocks were both received within a certain amount of time. In some examples, proximity detector module 52 may determine that two blocks are in close proximity when the blocks are determined to be in close spatial proximity or in close temporal proximity. In some examples, proximity detector module 52 may determine that two blocks are in close proximity when the blocks are determined to be both in close spatial proximity and in close temporal proximity.

Proximity detector module 52 may correspond to a sequential detector for a single business scaling unit (BSU) SPC-1 (storage performance council) workload, in some examples. In such examples, a garbage collection unit may be filled with sequential data, which may result from a very simple mapping-complexity-limited implementation that does not take account of temporal proximity. In other examples, proximity detector module 52 may correspond to multiple sequential stream detectors for a multiple-BSU SPC-1 workload, or multiple sequential stream detectors for a personal video recorder (PVR) or other host device that stores interleaved sequential streams for multiple recorded streams to an SSD concurrently.

In another example, proximity detector module 52 may be included in a file system that updates a file allocation table (FAT) at nearly the same time that data referenced by the FAT is updated. For example, proximity detector module 52 may speculatively parse a partition table, file system, or other construct to search for patterns matching a particular signature. When such a pattern is found, and when proximity detector module 52 determines that small writes to a possible FAT are happening just before or after writes to the data regions that appear to be referenced by that portion of the FAT, proximity detector module 52 may determine that the data referenced by the FAT is related to the FAT writes.

In still another example, proximity detector module 52 may be included in a database system that updates a data hash after updating user data. Proximity detector module 52 may analyze the "heat" or recent accesses of various regions, and then speculate that a smaller, very "hot" region contains a hash. Proximity detector module 52 may then group writes that occur soon after bulk user data is written with the bulk user data. Additional details regarding the use of heat for grouping writes together may be found in U.S. Publication No. 2011/0264843, the entire contents of which are hereby incorporated by reference.

In some examples, LBA storage module 50, garbage collection module 44, or another module of control unit 40, may determine whether further related data will be arriving anytime "soon." For example, after a host computer coupled to SSD 10 writes a set of data to SSD 10, including blocks of a segregation set, LBA storage module 50 may determine a probability that the host computer will write additional data that is also part of the segregation set in the near future. For example, LBA storage module 50 may determine a time since a last write of data that is determined to belong to the segregation set, and after a certain period of time has expired without additional write requests including data that belongs to the segregation set, determine that it is unlikely that additional data of the segregation set will be written in the near future. This time period may be 2 seconds, as one example, although the time period may be customized by an administrator or other user.

Segregation module 42 may segregate blocks to a common storage unit in response to host writing, garbage collection, or both. For example, if the host computer writes with a certain temporal proximity, then segregation module 42 may group the written data into a segregation set based on the writing activity, and then when garbage collection occurs, the still-valid data in a garbage collection unit could be segregated based on being garbage-collected from a garbage collection unit at a single garbage collection selection instant. This segregation may further be based on the data being written by the host computer in a certain time range and not overwritten by data later.

Probabilistic estimator module 46 may track a confidence value for each segregation set that represents how well the segregation set represents what is believed to be the "true" set. That is, the confidence value may represent confidence that the segregation set includes blocks that should be included and excludes blocks that should be excluded. Probabilistic estimator module 46 may implement an infinite impulse response filter that estimates the confidence value for a segregation set based on a previous confidence value for a previous version of the segregation set and a current confidence value for a current version of the segregation set. Over time, the confidence value may be adjusted based on blocks that are repeatedly present in the segregation set, blocks that are added to the segregation set, blocks that are removed from the segregation set, a number of times the segregation set has been written to a common storage unit, time between reads and writes of the segregation set, or other metrics for the segregation set.

Figure 3:
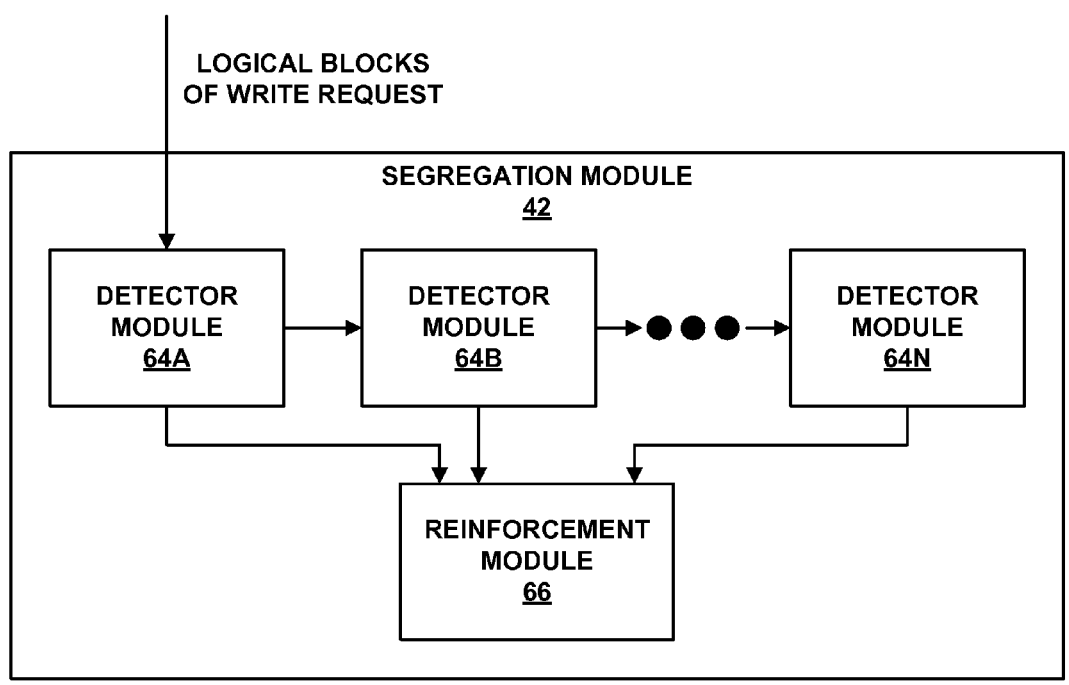
FIG. 3 is a block diagram illustrating components of an example segregation module.

FIG. 3 is a block diagram illustrating example components of segregation module 42. In the example of FIG. 3, segregation module 42 includes a number of detector modules 64A-64N (hereinafter "detector modules 64") and a reinforcement module 66. In other examples, segregation module 42 may include only one or more detector modules 64 or only reinforcement module 66. Detector modules 64 and reinforcement module 66 may be functionally integrated, in some examples. In other examples, segregation module 42 may include detectors for detecting logical blocks that generally relate to a common object, e.g., blocks that correspond to a common objects when the set of blocks have logical block addresses in close spatial and/or temporal proximity when the blocks are to be initially stored, correspond to two or more streams that are periodically accessed at expected rates, include file system data, or when a host computer explicitly indicates that the logical blocks correspond to a common object.

In general, detector modules 64 are configured to detect a set of logical blocks in a write request that can be stored to a common storage unit. Detector modules 64 may each detect a set of logical blocks that can be stored to a common storage unit without referring to existing segregation sets. In this manner, detector modules 64 may make an initial determination of which logical blocks to segregate.

Detector modules 64 may comprise separate instances in software of a detector software object, that is, a piece of software having member functions and/or member data. Detector modules 64 may be executed in a polling loop (e.g., in a round robin fashion) or may be executed as parallel threads in a multi-threaded process. When detector modules 64 are implemented in software or firmware, segregation module 42 may include hardware for storing and executing the software, such as, for example, a computer-readable storage medium comprising instructions for detector modules 64 and one or more processors that execute the instructions. In some examples, detector modules 64 may each correspond to individual hardware units, e.g., ASICs, DSPs, or FPGAs.

Detector modules 64 may be configured to detect sets of logical blocks to segregate in various ways. In some examples, detector module 64A may first receive logical blocks of a write request. Detector module 64A may initialize on the LBA of a first one of the logical blocks and begin determining whether the first block belongs to a set that should be segregated. For example, detector module 64A may compare the LBA of the next block to the LBA of the first block to determine whether the LBAs are related, e.g., in sequence or within a certain spatial proximity. If the LBA of the next block is related to the LBA of the first block, detector module 64A may add the next block to the set. Otherwise, detector module 64A may pass the block to detector module 64B, which may initialize on the LBA of this block and begin inspecting other blocks received in close temporal proximity to find LBAs that are related to the LBA of this block.

A sequence of LBAs may correspond to an ordering of LBAs in increasing order with differences between adjacent LBAs equal to a particular value, e.g., one. Sequential LBAs are one example of a set of LBAs that may be stored to a common storage unit. In other examples, LBAs with close spatial proximity may be stored to a common storage unit. A set of LBAs having close spatial proximity may correspond, in some examples, to a set comprising LBAs such that, for each LBA of the set, the LBA is within a particular number of addresses of at least one other LBA of the set. The particular number of addresses may be configurable, a hard-coded value, vary based on analyzed parameters, or vary based on other mechanisms.

In this manner, logical blocks that are received in close temporal proximity may be passed through detector modules 64 in a cascading fashion. When one of detector modules 64 is not yet initialized, the one of detector modules 64 may initialize on the LBA of the first logical block received by the one of detector modules 64. On the other hand, when one of detector modules 64 is initialized, it may determine whether LBAs of received logical blocks are related to LBAs of logical blocks in a set being analyzed by the one of detector modules 64. LBAs that are not related to LBAs of the set may be passed to a next one of detector modules 64.

Upon initialization, detector modules 64 may start a respective timer. When detector modules 64 receive a logical block determined to belong to the set being analyzed, detector modules 64 may restart the timer or add additional time to the timer. When the timer expires for one of detector modules 64, the one of detector modules 64 may treat the set of related logical blocks as being closed. That is, the one of detector modules 64 may send the set of logical blocks to reinforcement module 66 and clear its initialization.

Accordingly, continuing with this example, the one of detector modules 64 may reinitialize upon receiving a next logical block. In some examples, the order in which detector modules 64 may change based on when detector modules 64 determine that a set has been closed. For example, when one of detector modules 64 closes a segregation set, it may be assigned to receive logical blocks last out of all of detector modules 64, to avoid initializing on the LBA of a logical block that may otherwise have been added to a segregation set by a later one of detector modules 64.

Reinforcement module 66 may reinforce decisions to segregate sets of logical blocks made by detector modules 64. For example, reinforcement module 66 may calculate the intersection of a set of logical blocks received from one of detector modules 64 with an existing segregation set stored to a common storage unit and store this intersection to a common storage unit. In some examples, when the size of the intersection is less than a first threshold, reinforcement module 66 may add logical blocks from the set determined by the one of detector modules 64 that passed the set to reinforcement module 66, and when the size is less than a second, smaller threshold, reinforcement module 66 may determine that the logical blocks of the set should not be segregated. This second threshold may be hard-coded, configurable, or vary based on analysis of logical blocks. Alternatively, reinforcement module may determine that the segregation set received from the one of detector modules 64 should be stored to a common storage unit and the existing segregation set, used as the basis for calculating the intersection, should be invalidated.

Reinforcement module 66 may also receive logical blocks that were not determined to be related by any of detector modules 64 from the last one of detector modules 64, e.g., detector module 64N. Reinforcement module 66 may store such logical blocks using conventional storage techniques. Alternatively, reinforcement module 66 may determine that these logical blocks are related at least due to having been received in close temporal proximity and calculate an intersection between this set of logical blocks and a set of logical blocks stored in a common storage unit.

Figure 4:
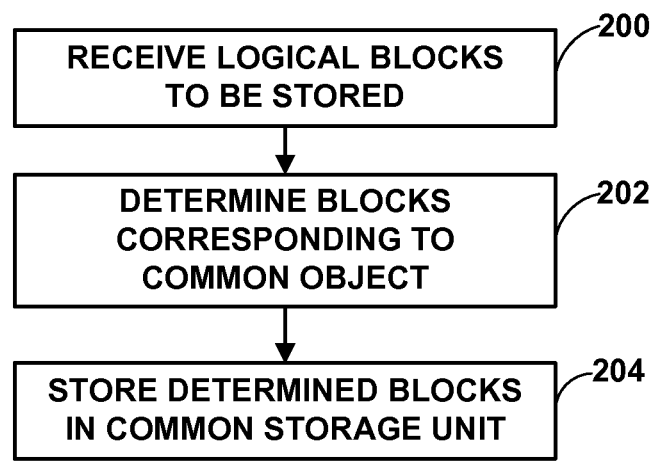
FIG. 4 is a flowchart illustrating an example method for storing a set of logical blocks related to a common object in a common storage unit.

FIG. 4 is a flowchart illustrating an example method for storing a set of logical blocks related to a common object in a common storage unit. Although described with respect to controller 12 of SSD 10 of FIG. 1, it should be understood that other units may be configured to perform the method of FIG. 4. For example, the method of FIG. 4 may be performed by a control unit of a drive, a processor of a host computer, or other unit.

Initially, controller 12 may receive a number of logical blocks to be stored in SSD 10 (200). Controller 12 may then determine a subset of the logical blocks that correspond to a common object (202). The object may correspond to any type of object with which multiple logical blocks may be associated. For example, the object may correspond to a particular type of file, such as a file system object or a multimedia file. As another example, the object may correspond to a set of logical blocks having LBAs in close spatial proximity, which may or may not be in sequence. As still another example, the object may correspond to an object explicitly received from the host in the form of an object. As another example, the object may correspond to a list of storage locations specified by the host.

Streams of data to be stored to SSD 10 may have multiple components that, taken together, represent the full set of information belonging to the stream. As an example, audio/video encoders/decoders (endecs) that put audio data for a multimedia file in a separate file system object than video data for the same multimedia file. For example, data for an audio track of a multimedia file may be stored separately from data for a video track of the same multimedia file. For example, multi-channel audio may be stored in separate objects for various multi-media streams with separate but related objects.

Isochronous objects, that is, objects stored at the same time and/or at regular time intervals, can be detected by their temporal properties. Other characteristics may also be used to detect an affinity between such objects. Real-time streams are often handled with isochronous accesses such that commands for accessing (e.g., reading or writing the streams) come at regular intervals, perhaps with varying transfer sizes when variable rate encoders are used. Detecting that accesses are coming at regular periods can expose the existence of an object access, even if the accesses are not to proximate addresses. Other characteristics could include data rates that indicate an audio stream or video stream. Detecting two concurrent streams with data rates in two expected ranges can indicate two components of a single object are being accessed.

Accordingly, controller 12 may detect reading and/or writing of two or more streams having data rates in expected data ranges. That is, controller 12 may detect accesses to a first set of logical blocks at a first rate, detect accesses to a second set of logical blocks at a second rate, and determine that the accesses to the first set of logical blocks and the second set of logical blocks occur at approximately the same time. In this manner, controller 12 may determine that a set of logical blocks correspond to a common object that may be stored together, e.g., within a common storage unit.

As another example, controller 12 may detect accesses to file system information. File system information is typically placed on the same storage device as objects managed by the file system. File systems generally have well known data structures that appear at well known locations on a drive, or locations specified by other well known locations such as a Master Boot Record (MBR). Accordingly, controller 12 may snoop within logical blocks to attempt to detect file system information and use the file system information to decode the state of the file system. This is an example of a direct detector of the objects in the file system, albeit through snooping rather than an explicit host-to-drive interface.

As still another example, controller 12 may detect host-specified objects. Host computers may specify the existence of objects and access data by making object references in accordance with, e.g., Object-Based Storage Device Commands. Controller 12 may therefore determine that a set of logical blocks corresponding to a host-defined object should be stored in a common storage unit.

As a further example, a host may allocate storage locations to objects, as with conventional file systems, but access the storage by first specifying to controller 12 a list of locations for an object to be accessed. In such cases, controller 12 may associate the list of locations with an object, and store logical blocks corresponding to the list of locations in a common storage unit.

As another example, controller 12 may determine that logical blocks having logical block addresses that are in close spatial proximity are associated with a common object. Close spatial proximity may relate to logical blocks having LBAs received in sequence, or within a certain number of addresses of an LBA of a previously received logical block.

In any case, after determining a set of blocks that correspond to a common object, controller 12 may store the set of blocks in a common storage unit (204). In this manner, the method of FIG. 4 generally includes receiving a plurality of logical blocks to be stored in a storage device, determining a subset of the logical blocks that correspond to a common object, and storing each of the logical blocks corresponding to the common object in a common storage unit of the storage device.

Figure 5:
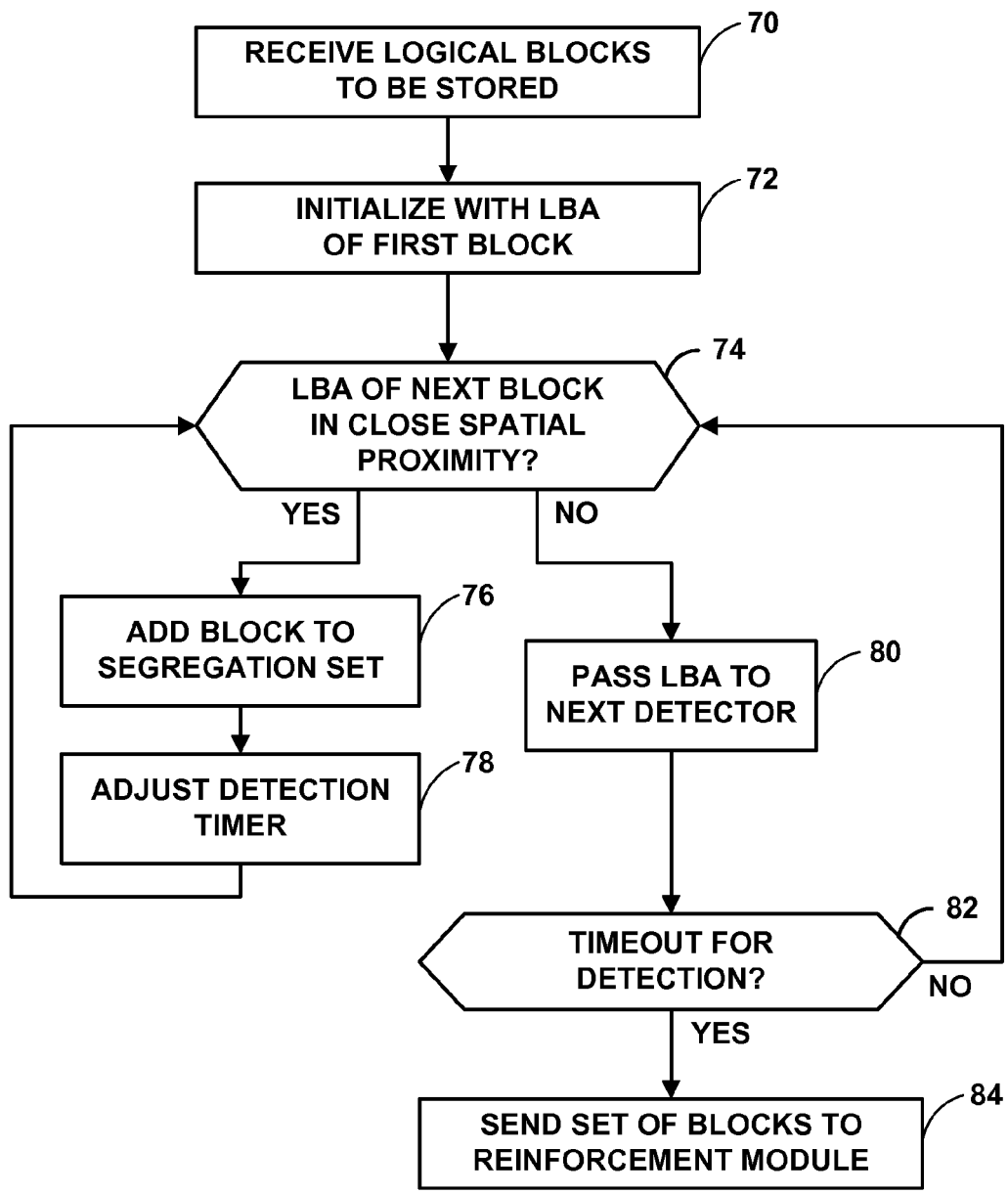
FIG. 5 is a flowchart illustrating an example method for determining a set of blocks to be segregated.

FIG. 5 is a flowchart illustrating an example method for determining a set of blocks to be segregated. The method of FIG. 5 may be executed by individual ones of detector modules 64 (FIG. 3). For purposes of explanation, the method of FIG. 5 is described with respect to detector module 64A, although it should be understood that any of detector modules 64 or other modules or units may also perform the method of FIG. 5. Moreover, it should be understood that other detectors that detect sets of blocks that relate to a common object for reasons unrelated to proximity of LBAs may be included in addition to, or in the alternative to, detector modules 64. Such detector modules may use respective methods for detecting relationship to a common object. FIG. 5 generally corresponds to one example of steps 200 and 202 of the method of FIG. 4, in greater detail, although it should be understood that step 202 of FIG. 4 is not limited to determining whether logical blocks have LBAs in close proximity.

Initially, detector module 64A may receive one or more logical blocks to be stored to SSD 10 (70). Detector module 64A may also initialize a detection timer at this time. Detector module 64A may receive the logical blocks one by one, or may receive a group of logical blocks at substantially the same time. It is assumed, for the example of FIG. 5, that detector module 64A has not yet initialized with an LBA for determining a segregation set at this point. Accordingly, detector module 64A may initialize with the LBA of a first one of the received logical blocks (72). That is, detector module 64A may begin determining whether subsequent ones of the logical blocks are related to the first one of the received logical blocks based on whether the LBAs of the subsequent logical blocks are related to the LBA of the first one of the logical blocks. Detector module 64A may use the first received logical block as the starting point for creating a segregation set.

In the example of FIG. 5, detector module 64A determines whether two blocks are related based on whether the LBAs of the two blocks are in close spatial proximity (74). For example, detector module 64A may determine whether the LBA of the next logical block is in sequence with the previous logical block, or within a certain number of addresses of the previous logical block. In some examples, detector module 64A may determine whether the LBA of the next logical block is within a certain number of addresses of at least one of the logical blocks of the segregation set. In other examples, detector modules 64 may use other criteria for determining whether a group of logical blocks are related and should be segregated.

If detector module 64A determines that the LBA of the next logical block is in close spatial proximity with the LBA of the previous logical block (or an LBA of one of the logical blocks in the segregation set) ("YES" branch of 74), detector module 64A may add the logical block to the segregation set (76) and adjust the detection timer (78). For example, detector module 64A may reset the detection timer or adjust the detection timer by a certain amount of time to increase the amount of time until the timer expires.

On the other hand, if detector module 64A determines that the LBA of the next logical block is not in close spatial proximity ("NO" branch of 74), detector module 64A may pass the LBA to the next detector (80), e.g., detector module 64B in the example of FIG. 3. Detector module 64A may then determine whether the detection timer has expired, resulting in a timeout for the period of time during which to create the segregation set (82). If the detection timer has not yet expired ("NO" branch of 82), detector module 84A may then examine the LBA of the next logical block and determine whether or not it is in close spatial proximity (74). On the other hand, if the detection timer has expired ("YES" branch of 82), detector module 64A may send the set of blocks to reinforcement module 66 (84). In some examples, expiration of the timer may be treated as an interrupt, such that detector module 64A may send the segregation set to reinforcement module 84 immediately, without waiting for a next logical block.

Figure 6:
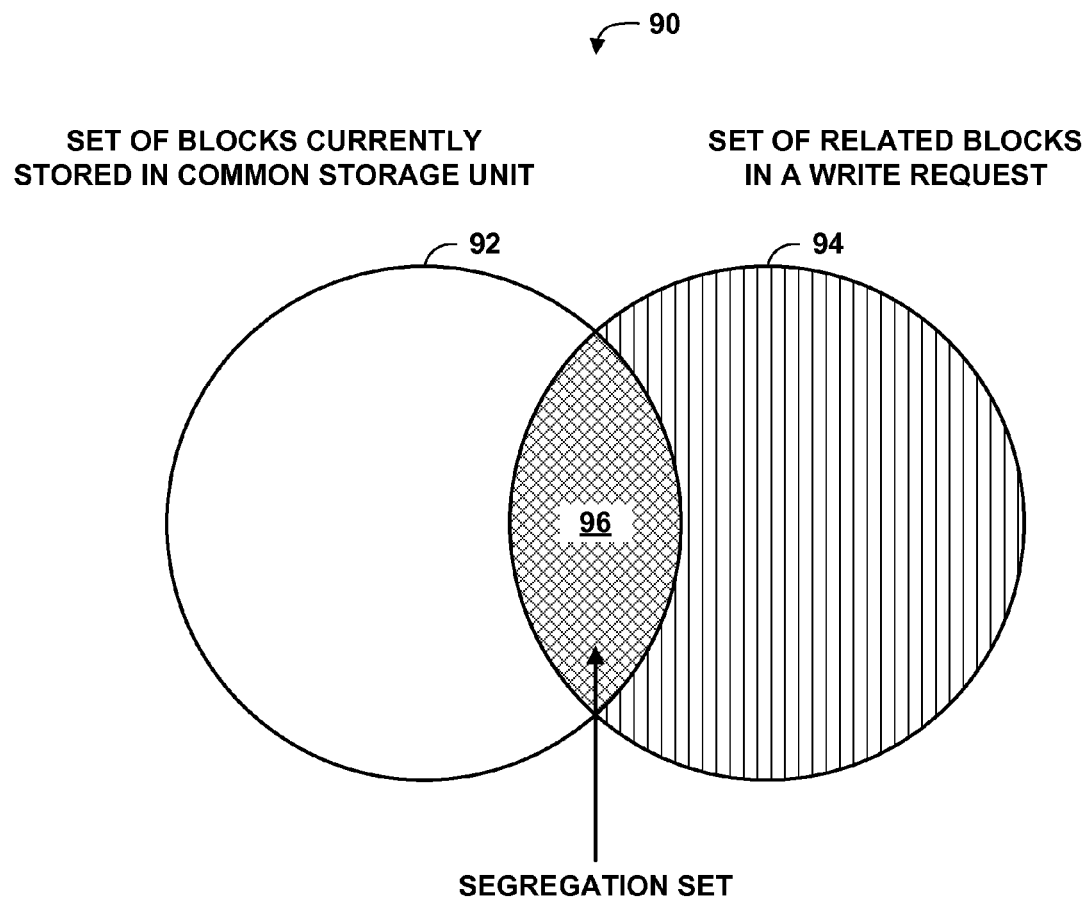
FIG. 6 is a conceptual Venn diagram illustrating a segregation set resulting from the intersection of a set of blocks currently stored in a common storage unit and a set of blocks in a write request.

FIG. 6 is a conceptual Venn diagram 90 illustrating a segregation set 96 resulting from the intersection of a set of blocks currently stored in a common storage unit 92 and a set of related blocks in a write request 94. Set 92 represents a set of blocks currently stored in a common storage unit, such as, for example, a set of blocks stored in an erasure block. Set 94 represents a set of blocks in a write request received from a host computer over a certain period of time, and in some examples, may additionally have been determined to be related by one of detector modules 64 to be related. For example, the one of detector modules 64 may determine that the blocks of set 94 are related due to having LBAs in close spatial proximity. In some examples, the blocks of set 94 may be considered related simply because they were written in close temporal proximity. In one example, segregation module 42 may compare addresses of one or more blocks in set 94 to addresses of segregated sets, stored by segregated set table 60, to determine whether any of the currently segregated sets includes one or more of the blocks of set 94. In one example, segregation module 42 may compute the intersection between the blocks represented by set 94 with each current segregation set. It should be understood that FIG. 6 is only one example of how segregation sets may be determined, and that in other examples (e.g., when a segregation set is first determined), no intersection may need to be calculated.

In some examples, to determine whether to segregate blocks of the write request, segregation module 42 may determine a size of the subset resulting from the intersection of set 92 and set 94. When segregation module 42 determines that the size of the subset exceeds a threshold segregation set size, segregation module 42 may store blocks represented by subset 96 to a common storage unit, e.g., one of erasure blocks 24. When the size of the subset is less than the size of the erasure block, segregation module 42 may additionally include in the erasure block additional blocks from set 94. In this manner, segregation module 42 may include in the segregation set blocks that were written in close temporal proximity to blocks of the segregation set, to attempt to determine whether these blocks should be included in the segregation set when the segregation set is later written to SSD 10 again by the host.

On the other hand, when the size of the subset does not exceed the threshold, segregation module 42 may write blocks in the write request to a next available page of a current erasure block. In another example, segregation module 42 may calculate the intersection of set 94 with each currently segregated set, and/or one or more existing erasure blocks, and compare the size of the resulting subset to the threshold. Segregation module 42 may then write the blocks of the write request to a current erasure block only when all such intersections fail to produce a subset whose size exceeds the threshold.

Figure 7:
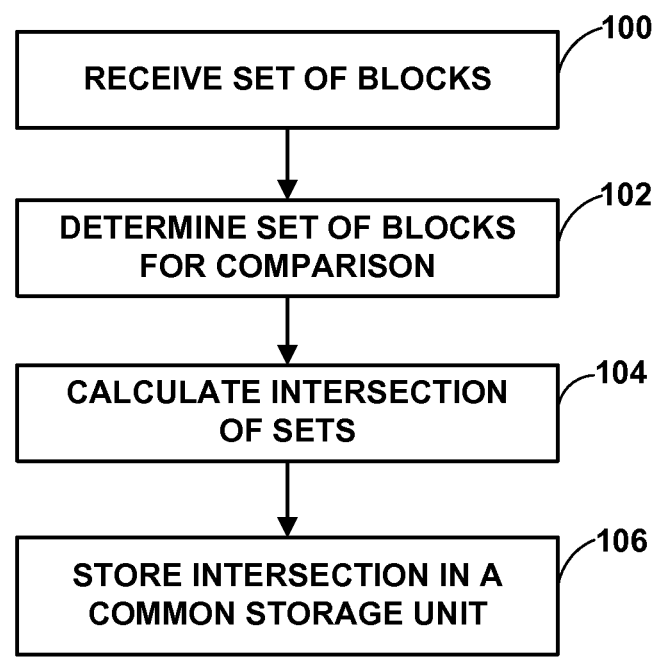
FIG. 7 is a flowchart illustrating an example method for segregating a set of blocks to a common storage unit.

FIG. 7 is a flowchart illustrating an example method for segregating a set of blocks to a common storage unit. The method of FIG. 7 is discussed with respect to controller 12 and, more particularly, segregation module 42, for purposes of example. However, it should be understood that other modules, units, or devices may perform the method of FIG. 7 to segregate a set of blocks.

Initially, in the example of FIG. 7, control unit 40 receives a set of blocks in a write request from a host computer (100). The write request may specify LBAs for blocks in the write request. Control unit 40 may also receive the blocks in a number of write requests received over a period of time, rather than in a single write request.

In response to receipt of the write request, segregation module 42 may determine whether to segregate any of the blocks of the write request. Initially, segregation module 42 may determine a set of blocks to be used for comparison to the set of blocks of the write request (102). In general, the set of blocks used for comparison may all be stored in a common storage unit, such as an erasure block. For example, segregation module 42 may select the set of blocks for comparison from a previously segregated set of blocks. Segregation module 42 may search segregated set table 60 to identify existing segregation sets having one or more LBAs in common with the LBAs of the write request. Additionally or alternatively, segregation module 42 may search erasure blocks with at least some valid data to determine whether any of the erasure blocks have one or more LBAs in common with the LBAs of the write request.

After determining a set of block to be used as the basis of comparison, segregation module 42 may determine the intersection of the set of blocks from the write request and the set of blocks currently stored in a common storage unit (104). In general, the intersection of these two sets includes LBAs that are present in both sets. To determine the intersection, segregation module 42 may iterate through each set and determine whether an LBA present in one of the sets is also present in the other. When an LBA is present in both sets, segregation module 42 may add the logical address to the subset resulting from the calculation of the intersection. The pseudocode below presents one possible implementation for computing the intersection of two sets:

```
addressSet computeIntersection (addressSet A, addressSet B) {
    addressSet intersection;
    for (int i=0; i<A.size( ); i++) {
        boolean matchNotFound=true;
        for (int j=0; j<B.size( ) && matchNotFound; j++) {
            if (A.getMember(i) == B.getMember(j)) {
                intersection.Add(B.getMember(j));
                matchNotFound=false;
            }
        }
    }
    return intersection;
}
```

The example pseudocode for the function computeIntersection( ) uses software objects of type "addressSet" to store LBAs of blocks. In general, a software object may be considered an object created in software according to object oriented programming principles that includes one or more member variables and/or member functions. The function computeIntersection receives two addressSet objects and returns an object of type "addressSet" that includes the LBAs of blocks included in the intersection of both of the sets received as arguments. It is assumed that objects of type addressSet include member functions "size( )" that the returns the size (that is, number of entries) of the object, "getMember(n)" that retrieves the nth element of the object, and "add(x)" that adds element x to the object. To calculate the intersection, the computeIntersection function provides an outer loop that iterates through set A and an inner loop that iterates through set B. In general, the inner loop searches set B for an element that matches a current element of set A. When a match is found the address is added to object "intersection." Ultimately, after both loops have finished, the "intersection" object is returned as an addressSet that includes addresses that are common to both set A and set B.

After calculating the intersection, segregation module 42 may store the logical blocks having addresses in the intersection in a common storage unit, such as a common erasure block (106). The common storage unit may, in other examples, correspond to a set of erasure blocks, a particular portion of a hard drive or optical storage medium, or other common storage unit, depending on the relevant computer-readable storage medium for which the techniques of this disclosure are being performed. Segregation module 42 may then update segregated set table 60 to reflect the storage of the segregation set.

In some examples, segregation module 42 may further include additional elements from the set of LBAs in the write request in the common storage unit. For example, segregation module 42 may determine whether the erasure block to which the blocks having LBAs in the intersection will become full after the blocks are written to the erasure block. When the blocks will not fill the erasure block, segregation module 42 may add one or more blocks from the write request to the erasure block. In this manner, segregation module 42 may provide mechanisms both for increasing and decreasing the elements of a segregation set. Accordingly, over time as a segregation set is repeatedly written to and read from SSD 10, the segregation set as stored may conform to the actual set of blocks that are typically read and written together as a group.

Although described primarily with respect to a write request received from a host, similar techniques may be used to segregate blocks during garbage collection. For example, garbage collection module 44 may inspect valid data of various garbage collection units to determine whether the data was written in close temporal proximity and/or whether the data is in close spatial proximity (e.g., has addresses within a certain range of each other). Garbage collection module 44 may collect such blocks that are in close spatial and/or temporal proximity and store the blocks in a common storage unit during garbage collection. The common storage unit to which these blocks are stored may serve as one of the sets of blocks used for comparison when the host later writes a set of blocks to SSD 10. That is, segregation module 42 may compare LBAs of the write request to LBAs of the blocks segregated during garbage collection, calculate the intersection, and then store the intersection to a common storage unit.

Figure 8:
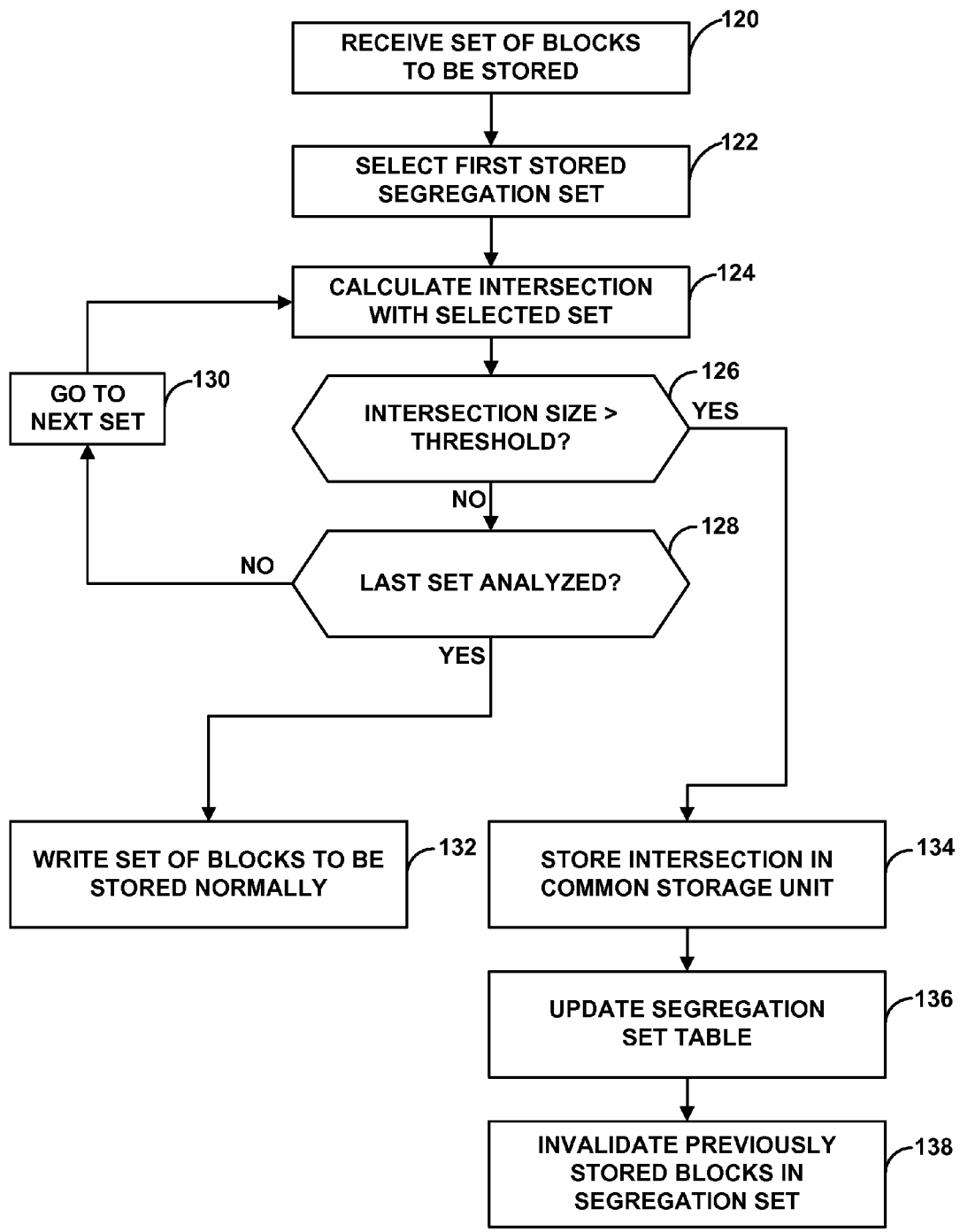
FIG. 8 is a flowchart illustrating an example method for segregating a set of blocks in greater detail.

FIG. 8 is a flowchart illustrating an example method for segregating a set of blocks in greater detail. The method of FIG. 8 is again discussed with respect to controller 12 and segregation module 42, for purposes of example. However, it should be understood that other modules, units, or devices may perform the method of FIG. 8 to segregate a set of blocks.

Initially in the example of FIG. 8, segregation module 42 receives a set of blocks to be stored (120). The write request may specify LBAs for blocks in the write request. Control unit 40 may also receive the blocks in a number of write requests received over a period of time, rather than in a single write request.

In response to receiving the set of blocks to be stored, segregation module 42 may first determine whether any of the blocks should be segregated to a common storage unit. To make this determination, segregation module 42 may iteratively search existing segregation sets to determine whether there is overlap between LBAs of the blocks to be stored and LBAs of an existing segregation set. Segregation module 42 may, for example, start with a first segregation set (122) and calculate a subset resulting from an intersection between the LBAs of the blocks to be stored and the selected segregation set (124).

Segregation module 42 may then compare a size of the subset resulting from the calculated intersection to a threshold segregation set size (126). In the example of FIG. 8, segregation module 42 determines whether the size of the subset is greater than the threshold. In other examples, segregation module 42 may determine whether the size of the subset is at least the size of the threshold, e.g., greater than or equal to the value of the threshold.

When the subset resulting from the intersection of the selected segregation set and the set of LBAs to be stored is not greater than the threshold ("NO" branch of 126), segregation module 42 may determine whether all segregation sets have been analyzed (128). If not ("NO" branch of 128), segregation set 42 proceeds to a next available segregation set (130) and again determines the intersection and compares the size of the subset resulting from the intersection to the threshold. If none of the existing segregation sets yields an intersection with the set of blocks to be stored that is greater than the threshold ("YES" branch of 128), segregation module 42 may store the set of blocks normally, e.g., to a next available, non-segregated erasure block (132). In some examples, when none of the existing segregation sets yields an intersection with the set of blocks to be stored that is greater than the threshold, segregation module 42 may iterate through existing, non-segregated erasure blocks, calculate intersections with the set of blocks to be stored, and determine whether the subset resulting from these intersections is greater in size than the threshold.

On the other hand, when a subset resulting from an intersection is found that has a size exceeding the threshold ("YES" branch of 126), segregation module 42 may store the blocks of the intersection to a common storage unit (134). In some examples, when the size of the subset is less than the size of the storage unit, segregation module 42 may also store blocks that were received for storage in close temporal proximity to the blocks of the subset calculated from the intersection in the segregation set, that is, in the same common storage unit as the blocks of the intersection. In some examples, segregation module 42 may store blocks that are in both close temporal proximity and close spatial proximity to the blocks of the subset in the common storage unit. That is, segregation module 42 may determine whether blocks received in close temporal proximity to the blocks of the subset have LBAs within a certain range of one or more of the LBAs of the blocks determined to belong to the intersection, and store such blocks in the common storage unit.

Segregation module 42 may also update segregated set table 60 after storing the blocks to the common storage unit (136). For example, segregation module 42 may update segregation set table 60 to reflect changes to the corresponding segregation set or addition of a new segregation set when the segregation set did not previously exist. In addition, segregation module 42 may invalidate blocks of the previously stored version of the segregation set (or storage unit) to represent that the newly stored version of the segregation set is valid (138). In this manner, when a read request arrives for an LBA of a block stored in the segregation set, the block may be retrieved from the most recently stored version of the segregation set.

By performing these techniques, a storage device may store data that is frequently accessed (e.g., read or written) as a group in a common storage unit. Therefore, time required to access the data may be reduced, because access latency for the data may be amortized over more data that the host requests in a set of reads. These techniques may also improve garbage collection, in that when a portion of the common storage unit is invalidated by host writing, it is likely that the rest of the common storage unit will also be invalidated in the near future by further host writing.

Figure 9:
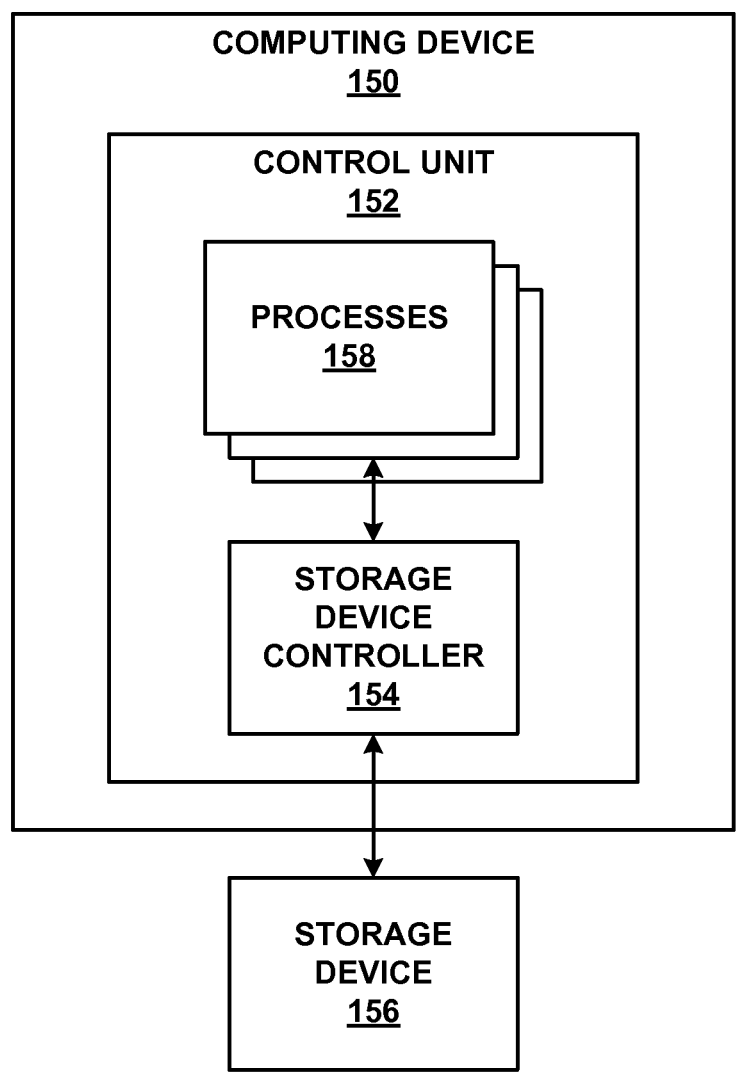
FIG. 9 is a block diagram illustrating an example system in which a computing device is coupled to a storage device that is controlled by a control unit separate from the storage device.

FIG. 9 is a block diagram illustrating an example system 160 in which a computing device 150 is coupled to storage device 156 that is controlled by a control unit 154 separate from storage device 156. Storage device 156 may comprise, for example, a solid state drive (SSD), a flash drive, a disk drive, an optical reader and writer for, e.g., CD-RWs, DVD-RWs, rewriteable Blu-ray disks, or any other storage medium that utilize lifecycle management procedures. Although primarily described with respect to SSDs for purposes of example and explanation, it should be understood that the techniques of this disclosure may also be applied to any storage medium, e.g., any block access storage device, having blocks with lifecycle management procedures.

In the example of FIG. 9, computing device 150 includes control unit 152, which generally comprises hardware for executing processes 158 and storage device controller 154. Storage device controller 154 may include functionality similar to controller 12 (FIG. 2). In the example of FIG. 9, storage device controller 154 may correspond to software and/or firmware executed by control unit 152. For example, control unit 152 may execute an operating system, which includes storage device controller 154 as a driver to control storage device 156.

Control unit 152 may include hardware, software, firmware, or any combination thereof. For example, control unit 152 may comprise one or more processors, such as microprocessors, digital signal processors (DSPs), application specific integrated circuits (ASICs), field programmable gate arrays (FPGAs), or any other equivalent integrated or discrete logic circuitry, as well as any combinations of such components.

Processes 158 generally include one or more computing processes executed by control unit 150. Processes 158 interact with storage device controller 154 to store and/or retrieve data to/from storage device 156. Processes 158 may include, for example, office software such as a word processor or spreadsheet program, interactive media such as a music player, video player, or video game, Internet software such as an e-mail client or web browser, or any other processes performed on computing device 150.

Storage device controller 154 may receive requests from one or more of processes 158 to retrieve and/or store data to storage device 156. Storage device controller 154 may further perform the techniques of this disclosure to segregate a set of blocks to a common storage unit. In this manner, FIG. 9 represents one example of a system including a storage device configured to store logical blocks in a plurality of storage units, and a computing device coupled to the storage device, the computing device comprising a control unit for controlling the storage device. The control unit, in the system, may be configured to receive a plurality of logical blocks to be stored in the storage device, wherein a first set of addresses comprises logical block addresses (LBAs) of the plurality of logical blocks. One of the plurality of storage units of the storage device may include logical blocks corresponding to a second set of addresses, and the control unit may be configured to determine an intersection of the first set of addresses with the second set of addresses and to store each of the logical blocks having LBAs in the determined intersection of addresses in a common storage unit of the storage device, wherein the common storage unit comprises one of the plurality of storage units.

FIG. 9 generally represents an example of a system including a storage device configured to store logical blocks in a plurality of storage units, and a computing device coupled to the storage device, the computing device comprising a control unit for controlling the storage device, wherein the control unit is configured to receive a plurality of logical blocks to be stored in the storage device, to determine a subset of the logical blocks that correspond to a common object, and to store each of the logical blocks corresponding to the common object in a common one of the plurality of storage units of the storage device. One example of such a system includes a storage device configured to store logical blocks in a plurality of storage units, and a computing device coupled to the storage device, the computing device comprising a control unit for controlling the storage device, wherein the control unit is configured to receive a plurality of logical blocks to be stored in the storage device, wherein a first set of addresses comprises logical block addresses (LBAs) of the plurality of logical blocks, to determine a subset of the set of addresses, the subset comprising LBAs that are in close spatial proximity, and to store each of the logical blocks having LBAs in the determined subset of addresses in a common storage unit of the storage device, wherein the common storage unit comprises one of the plurality of storage units.

Although described primarily with respect to solid state drives and solid state storage media, it should be understood that the techniques of this disclosure may also apply to other block based storage media. For example, the techniques of this disclosure may also be used to enable segregation of data that is commonly accessed together among storage units of magnetic storage media, such as a hard disk, or optical storage media, such a CD-ROM. By way of further example, techniques of the disclosure may be used in devices and methodologies that implement shingled magnetic recording, in which data is written to a storage medium in overlapping tracks and bands in the shingled media constitute "storage units." Techniques of the disclosure may also be used in hybrid devices that use both magnetic and non-volatile solid state (e.g., flash) storage, in which erasure blocks are stored in the non-volatile solid state storage device and "storage units" are stored on the magnetic media.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media. Computer-readable storage media should also be understood as non-transient computer-readable storage media.

Various examples have been described. It is to be understood that this detailed description is illustrative only, and various additions and/or modifications may be made to these embodiments, especially in matters of structure and arrangements of parts. Accordingly, the scope of the present disclosure should not be limited by the particular embodiments described above, but should be defined by the claims set forth below and equivalents thereof.

What is claimed is:

1. A method comprising:
   receiving, by a storage device, a plurality of logical blocks to be stored in the storage device, wherein a first set of addresses comprises logical block addresses (LBAs) of the plurality of logical blocks;
   determining an intersection of the first set of addresses with a second set of addresses, wherein the second set of addresses comprises LBAs of logical blocks in a storage unit of the storage device;
   comparing the size of the determined intersection with a threshold size; and
   storing each of the logical blocks having LBAs in the determined intersection of addresses in a common storage unit of the storage device, wherein the common storage unit is separate from the storage unit in which the logical blocks corresponding to the second set of addresses are stored when the size of the determined intersection is equal to or greater than the threshold size.

2. The method of claim 1, further comprising storing the logical blocks having LBAs outside of the determined intersection in one or more storage units other than the common storage unit of the storage device.

3. The method of claim 1, further comprising:
   determining whether the logical blocks having LBAs in the determined intersection fill the common storage unit; and
   when the logical blocks do not fill the common storage unit, storing one or more of the received plurality of logical blocks that do not have LBAs in the intersection in the common storage unit.

4. The method of claim 1, wherein storing each of the logical blocks comprises storing each of the logical blocks having addresses in the determined intersection in order of the addresses of the LBAs in the common storage unit.

5. The method of claim 1, wherein storing each of the logical blocks comprises storing each of the logical blocks having addresses in the determined intersection in an order in which the LBAs were received.

6. The method of claim 1, wherein the plurality of logical blocks comprises a first plurality of logical blocks, wherein the common storage unit comprises a first common storage unit, and wherein the determined intersection comprises a first determined intersection, the method further comprising:
   receiving a second plurality of logical blocks to be stored in the storage device, wherein a third set of addresses comprises LBAs of the second plurality of logical blocks;
   determining a second intersection of the third set of addresses with the first determined intersection; and
   storing each of the logical blocks having addresses in the second determined intersection of addresses in a second common storage unit of the storage device.

7. The method of claim 6, further comprising storing the logical blocks having addresses outside of the second determined intersection in one or more storage units other than the common storage unit of the storage device.

8. The method of claim 1, wherein receiving the plurality of logical blocks comprises receiving each of the plurality of logical blocks in close temporal proximity to each of the others of the plurality of logical blocks.

9. The method of claim 1, wherein receiving the plurality of logical blocks comprises receiving each of the plurality of logical blocks in close spatial proximity to each of the others of the plurality of logical blocks.

10. A storage device comprising:
    a control unit configured to receive a plurality of logical blocks to be stored in the storage device, wherein a first set of addresses comprises logical block addresses (LBAs) of the plurality of logical blocks; and
    a non-volatile memory configured to store logical blocks in a plurality of storage units, wherein one of the plurality of storage units includes logical blocks corresponding to a second set of addresses,
    wherein the control unit is configured to determine an intersection of the first set of addresses with the second set of addresses, to compare the size of the determined intersection with a threshold size, and to store each of the logical blocks having LBAs in the determined intersection of addresses in a common storage unit of the storage device, wherein the common storage unit comprises one of the plurality of storage units and is separate from the one of the plurality of storage units including the logical blocks corresponding to the second set of addresses when the size of the determined intersection is equal to or greater than the threshold size.

11. The storage device of claim 10, wherein the control unit is configured to determine whether the logical blocks having LBAs in the determined intersection fill the common storage unit and, when the logical blocks do not fill the common storage unit, to store one or more of the received plurality of logical blocks that do not have LBAs in the intersection in the common storage unit.

12. The storage device of claim 10, wherein the control unit is configured to store each of the logical blocks having addresses in the determined intersection in order of the addresses of the logical blocks in the common storage unit.

13. The storage device of claim 10, wherein the control unit is configured to store each of the logical blocks having addresses in the determined intersection in an order in which the logical blocks were received.

14. The storage device of claim 10, wherein the plurality of logical blocks comprises a first plurality of logical blocks, wherein the determined intersection comprises a first determined intersection, wherein the common storage unit comprises a first common storage unit, and wherein the control unit is configured to receive a second plurality of logical blocks to be stored in the storage device, wherein a third set of addresses comprises LBAs of the second plurality of logical blocks, determine a second intersection of the third set of addresses with the first determined intersection, and store each of the LBAs having addresses in the second determined intersection of addresses in a second common storage unit comprising one of the plurality of storage units of the storage device.

15. The storage device of claim 10, wherein the control unit is configured to receive each of the plurality of logical blocks in close temporal proximity to each of the others of the plurality of logical blocks.

16. The storage device of claim 10, wherein the control unit is configured to receive each of the plurality of logical blocks in close spatial proximity to each of the others of the plurality of logical blocks.

17. A system according to claim 10, comprising a computing device coupled to the storage device, the computing device comprising the control unit for controlling the storage device.

18. A computer-readable storage medium encoded with instructions that cause a processor to:
    receive a plurality of logical blocks to be stored in a storage device, wherein a first set of addresses comprises logical block addresses (LBAs) of the plurality of logical blocks;
    determine an intersection of the first set of addresses with a second set of addresses, wherein the second set of addresses comprises LBAs of logical blocks in a storage unit of the storage device;
    compare the size of the determined intersection with a threshold size; and
    store each of the logical blocks having LBAs in the determined intersection of addresses in a common storage unit of the storage device, wherein the common storage unit is separate from the one of the plurality of storage units including the logical blocks corresponding to the second set of addresses when the size of the determined intersection is equal to or greater than the threshold size.

19. The computer-readable storage medium of claim 18, further comprising instructions to:
    determine whether the logical blocks having LBAs in the determined intersection fill the common storage unit; and
    when the logical blocks do not fill the common storage unit, store one or more of the received plurality of logical blocks that do not have LBAs in the intersection in the common storage unit.

20. The computer-readable storage medium of claim 18, wherein the instructions to store each of the logical blocks comprise instructions to store each of the logical blocks having addresses in the determined intersection in order of the addresses of the LBAs that are to be stored in the common storage unit.

21. The computer-readable storage medium of claim 18, wherein the instructions to store each of the logical blocks comprise instructions to store each of the logical blocks having addresses in the determined intersection in an order in which the LBAs were received.

22. The computer-readable storage medium of claim 18, wherein the plurality of logical blocks comprises a first plurality of logical blocks, wherein the common storage unit comprises a first common storage unit, and wherein the determined intersection comprises a first determined intersection, the computer-readable storage medium further comprising instructions to:
    receive a second plurality of logical blocks to be stored in the storage device, wherein a third set of addresses comprises LBAs of the second plurality of logical blocks;
    determine a second intersection of the third set of addresses with the first determined intersection; and
    store each of the logical blocks having addresses in the second determined intersection of addresses in a second common storage unit of the storage device.

23. The computer-readable storage medium of claim 18, wherein the instructions to receive the plurality of logical blocks comprise instructions to receive each of the plurality of logical blocks in close spatial proximity to each of the others of the plurality of logical blocks.

\* \* \* \* \*